(12) United States Patent
Hikichi (10) Patent No.: US 11,392,294 B2
(45) Date of Patent: Jul. 19, 2022

(54) INFORMATION PROCESSING APPARATUS THAT CONTROLS STORAGE UNIT AND INFORMATION PROCESSING METHOD FOR TRANSMITTING AN INSTRUCTION TO WRITE DATA TO A STORAGE A NUMBER OF TIMES

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/275,158

(22) Filed: Feb. 13, 2019

(65) Prior Publication Data
US 2019/0265892 A1 Aug. 29, 2019

(30) Foreign Application Priority Data

Feb. 23, 2018 (JP) .............................. JP2018-031106

(51) Int. Cl.
*G06F 3/06* (2006.01)

(52) U.S. Cl.
CPC .......... *G06F 3/0608* (2013.01); *G06F 3/0655* (2013.01); *G06F 3/0679* (2013.01)

(58) Field of Classification Search
CPC .... G06F 3/0608; G06F 3/0655; G06F 3/0679; G06F 3/0619; G06F 3/0634
See application file for complete search history.

(56) References Cited

U.S. PATENT DOCUMENTS

| 2008/0244035 A1* | 10/2008 | Horie ..................... G06F 3/065 709/217 |
| 2015/0040135 A1* | 2/2015 | Benhase ............... G06F 12/128 718/104 |
| 2016/0291883 A1* | 10/2016 | Manohar .............. G06F 3/0656 |
| 2016/0371184 A1 | 12/2016 | Long |
| 2017/0308501 A1 | 10/2017 | Liu |
| 2018/0217751 A1* | 8/2018 | Agarwal ........... G11C 16/3422 |
| 2018/0335981 A1* | 11/2018 | Yoshida ............... G06F 3/0659 |

FOREIGN PATENT DOCUMENTS

| CN | 101436413 A | 5/2009 |
| CN | 102750224 A | 10/2012 |
| CN | 103384877 A | 11/2013 |
| CN | 105760467 A | 7/2016 |
| CN | 106205707 A | 12/2016 |
| CN | 106919675 A | 7/2017 |
| JP | 2015-197832 A | 11/2015 |
| JP | 2015-207208 A | 11/2015 |
| JP | 2017-135562 A | 2/2019 |

* cited by examiner

*Primary Examiner* — Jane Wei
(74) *Attorney, Agent, or Firm* — Canon U.S.A., Inc. IP Division

(57) ABSTRACT

An information processing apparatus includes an adjustment unit configured to adjust a write condition to reduce a capacity of data to be written to a first storage unit before starting predetermined processing including processing for writing data to the first storage, the write condition being a condition for writing data to the first storage unit, and a restoration unit configured to restore the write condition to an original condition set before the write condition is adjusted by the adjustment unit, after completion of the predetermined processing.

20 Claims, 5 Drawing Sheets

INFORMATION PROCESSING APPARATUS THAT CONTROLS STORAGE UNIT AND INFORMATION PROCESSING METHOD FOR TRANSMITTING AN INSTRUCTION TO WRITE DATA TO A STORAGE A NUMBER OF TIMES

BACKGROUND OF THE INVENTION

Field of the Invention

The aspect of the embodiments relates to an information processing apparatus and an information processing method.

Description of the Related Art

In recent years, as a nonvolatile storage device used as a storage, a solid state drive (SSD), an embedded Multi Media Card (eMMC), and the like, which use a flash memory including a semiconductor element, have been more used than a hard disk drive (HDD) having a drive mechanism. A storage device, such as an SSD or an eMMC, which uses a flash memory including a semiconductor element, is hereinafter simply referred to as an SSD. The HDD has a limitation on the number of operations of mechanism units, such as a head and a spindle motor, but has no upper limit for the number of write operations or the size of data to be written. On the other hand, the SSD includes no mechanism units and thus has no limitation on the number of operations. However, in the SSD, a data write operation is performed in units of blocks, each of which corresponds to a predetermined size of data, and the SSD has an upper limit on the total write data size. That is, the HDD and the SSD are different from each other in device operating characteristics. Accordingly, an information device on which a storage device is installed is to perform a control operation depending on the operating characteristics of the installed storage device. An information device on which an SSD is installed is to perform a control operation depending on the operating characteristics of the SSD.

For example, Japanese Patent Application Laid-open No. 2015-197832 discusses a technique for delaying write processing for writing data into a cell of a flash memory until data having a size larger than or equal to a predetermined size is accumulated in an SSD cache in firmware installed on an SSD. In other words, in the SSD firmware, a block including data accumulated in the cache is written into a flash memory. Thus, the ratio of write target data to the size of the block in which data is actually written in one write operation can be improved, and the number of write operations to write data to the flash memory can be reduced.

However, according to the technique discussed in Japanese Patent Application Laid-open No. 2015-197832, if write processing is delayed until data having a size larger than or equal to the predetermined size is accumulated in the cache in the firmware, data which has reached the SSD cannot be written within a predetermined time period. Therefore, if instantaneous interruption of a power supply occurs, data having a size smaller than the predetermined size can be lost.

SUMMARY OF THE INVENTION

According to an aspect of the embodiments, an apparatus includes an adjustment unit configured to adjust a write condition to reduce a capacity of data to be written to a first storage unit before starting predetermined processing including processing for writing data to the first storage, the write condition being a condition for writing data to the first storage unit, and a restoration unit configured to restore the write condition to an original condition set before the write condition is adjusted by the adjustment unit, after completion of the predetermined processing.

Further features of the disclosure will become apparent from the following description of exemplary embodiments with reference to the attached drawings.

DESCRIPTION OF THE EMBODIMENTS

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

(Description of Comparative Examples)

To reduce the size of data that can be lost due to instantaneous interruption of a power supply, there is a method for writing data to a cell of a flash memory in a solid state drive (SSD) in synchronization with a timing when an application sends an instruction to write data to the SSD. There is another method for writing data to a cell of a flash memory at predetermined intervals even before write target data having a size larger than or equal to a predetermined size is stored in a cache or the like. However, if a small amount of data is written by, for example, write processing in synchronization with a write instruction, the size of data to be actually written increases because the data is written to the flash memory in units of blocks. In other words, even if the size of write target data is smaller than the size of each block, the data corresponding to the block size is inevitably written. As a result, the total size of data written to the flash memory increases, which leads to a reduction in the life of the SSD.

Therefore, in order to perform a control operation depending on operating characteristics of the SSD, in one embodiment, the total size of data to be written is reduced while preventing an increase in the size of data that can be lost due to instantaneous interruption of a power supply. Exemplary embodiments of the disclosure have been devised in view of at least one of these aspects. The exemplary embodiments will be described in detail below with reference to the drawings.

(Details of Information Processing System)

Figure 1:
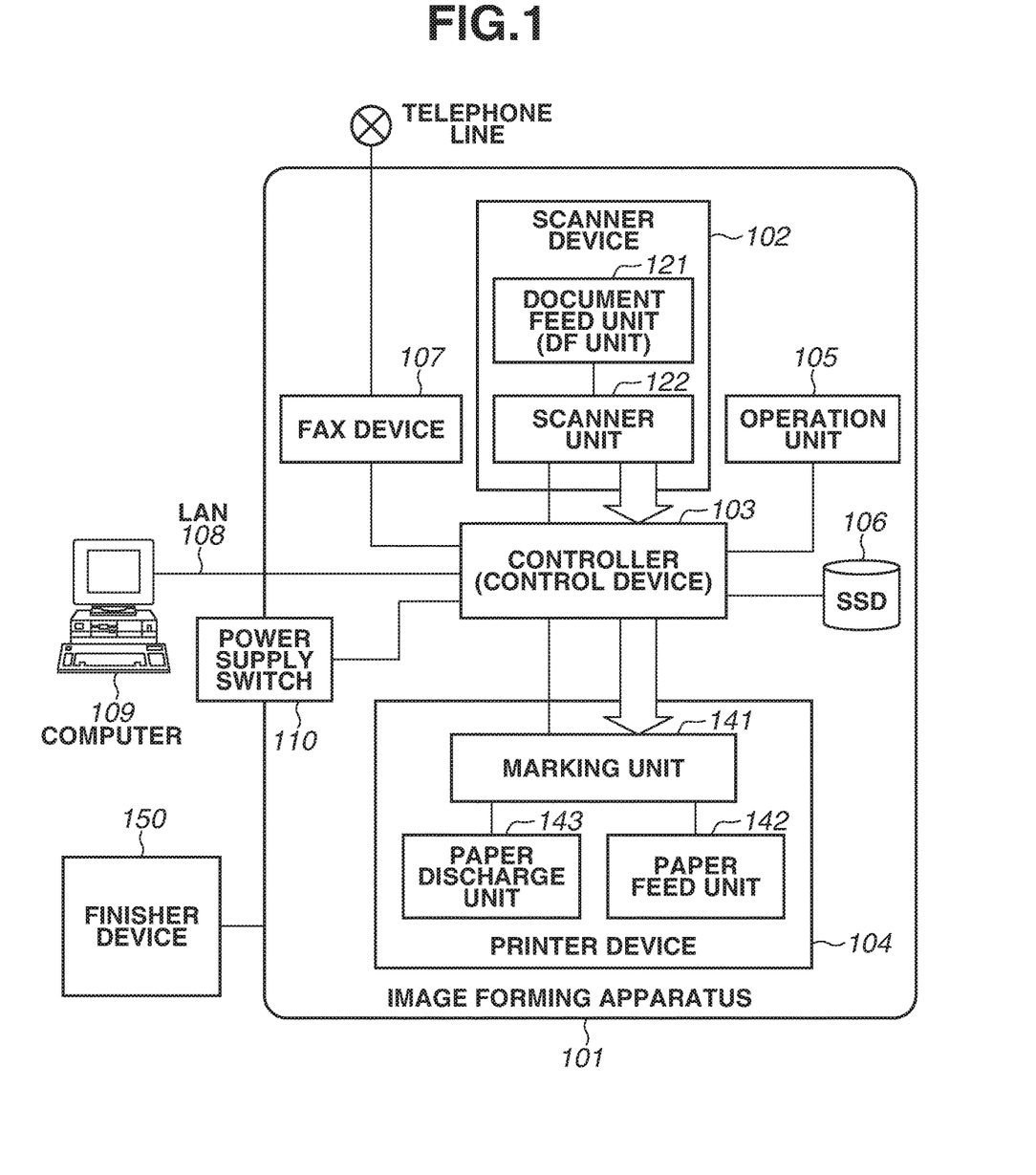
FIG. 1 is a diagram illustrating an example of a system configuration and the like of an information processing system according to a first exemplary embodiment.

A first exemplary embodiment will be described below. FIG. 1 is a diagram illustrating an example of a system configuration of an information processing system according to the first exemplary embodiment. The information processing system includes an image forming apparatus 101, a computer 109, and a finisher device 150. The image forming apparatus 101 and the computer 109 are communicably connected to each other via a local area network (LAN) 108. In the present exemplary embodiment, the image forming apparatus 101 is a multi-function peripheral including a print function, a scanner function, and a data communication function. The image forming apparatus 101 is an example of an information processing apparatus. The computer 109 is an information processing apparatus, such as a personal computer, a server apparatus, and a tablet device, which sends an instruction to the image forming apparatus 101 and acquires information from the image forming apparatus 101 via the LAN 108. The finisher device 150 is connected to the image forming apparatus 101 and performs processing, such as paper discharge, sorting, stapling, punching, and cutting, on a sheet device output from the image forming apparatus 101.

The image forming apparatus 101 receives a job from the computer 109 via the LAN 108. The image forming apparatus 101 can be connected to one or more computers.

A hardware configuration of the image forming apparatus 101 will be described. The image forming apparatus 101 includes a scanner device 102, a controller 103, a printer device 104, an operation unit 105, an SSD 106, a facsimile (FAX) device 107, and a power supply switch 110.

The scanner device 102 is a scanner device that optically scans an image from a document and converts the image into a digital image. The printer device 104 is a printer device that outputs the digital image onto a print medium such as a sheet device or a film. The operation unit 105 is an operation unit including a touch panel and hardware keys. The operation unit 105 is used to, for example, display a user's input and instruction to the image forming apparatus 101, information indicating a processing state, and the like.

The SSD 106 is a nonvolatile storage device, such as an SSD or an embedded Multi Media Card (eMMC), which uses a flash memory. The SSD 106 stores various programs, various images such as digital images to be printed and scanned images, various setting information, and the like. The SSD 106 is an example of a first storage unit. The FAX device 107 transmits and receives digital images to and from a telephone line or the like. The controller 103 is connected to each of the scanner device 102, the printer device 104, the operation unit 105, the SSD 106, and the FAX device 107, and sends an instruction to each of the elements to execute a job. The controller 103 will be described in detail below with reference to FIG. 3.

The image forming apparatus 101 inputs and outputs digital images to and from the computer 109 and receives an issuance of a job, an instruction from a device and the like via the LAN 108. The scanner device 102 includes a document feed unit 121 that can automatically and sequentially interchange document bundles, and a scanner unit 122 that can optically scan an image from a document fed from the document feed unit 121 and convert the scanned image into a digital image. The scanner unit 122 transmits image data, which has been converted into digital images, to the controller 103.

The printer device 104 includes a paper feed unit 142 that can sequentially feed sheets one by one from a sheet bundle, and a marking unit 141 that can print image data on each sheet fed from the paper feed unit 142. The printer device 104 also includes a paper discharge unit 143 that can discharge the sheets printed by the marking unit 141. The finisher device 150 performs processing, such as paper discharge, sorting, stapling, punching, and cutting, on a sheet device output from the paper discharge unit 143 of the printer device 104 in the image forming apparatus 101.

The power supply switch 110 is a switch that is used to switch ON/OFF of the power supply to the image forming apparatus 101 connected to the controller 103. When the power supply switch 110 is ON, power is fed to at least a power supply control unit 303, which is described below with reference to FIG. 4, the operation unit 105, and some components on a main board of the controller 103. When the power supply switch 110 is OFF, the power feeding to the image forming apparatus 101 is not immediately interrupted. In this case, predetermined termination processing associated with software or hardware is waited, and the power feeding to portions other than the portion that requires processing when the power supply switch 110 is ON, such as a part of the power supply control unit 303, is interrupted.

(Functions of Image Forming Apparatus)

An example of jobs (functions) that can be executed by the image forming apparatus 101 will be described.

The image forming apparatus 101 includes a copying function for recording images scanned by the scanner device 102 on the SSD 106 and performing printing through the printer device 104.

The image forming apparatus 101 includes an image transmission function for transmitting images scanned by the scanner device 102 to an external device, such as the computer 109, via the LAN 108.

The image forming apparatus 101 includes an image storing function for recording images scanned by the scanner device 102 on the SSD 106, and transmitting and printing the images as needed.

The image forming apparatus 101 includes an image print function for analyzing information about, for example, a page description language (PDL), which has been transmitted from the computer 109, and printing the image corresponding to the transmitted information through the printer device 104.

The operation unit 105 is connected to the controller 103, and includes a liquid crystal display (LCD) touch panel, a power saving button, a copy button, a cancel button, a reset button, a numeric keypad, and a user mode key. The operation unit 105 provides a user interface (I/F) for operating an image input/output system.

(Details of Printer Device)

Figure 2:
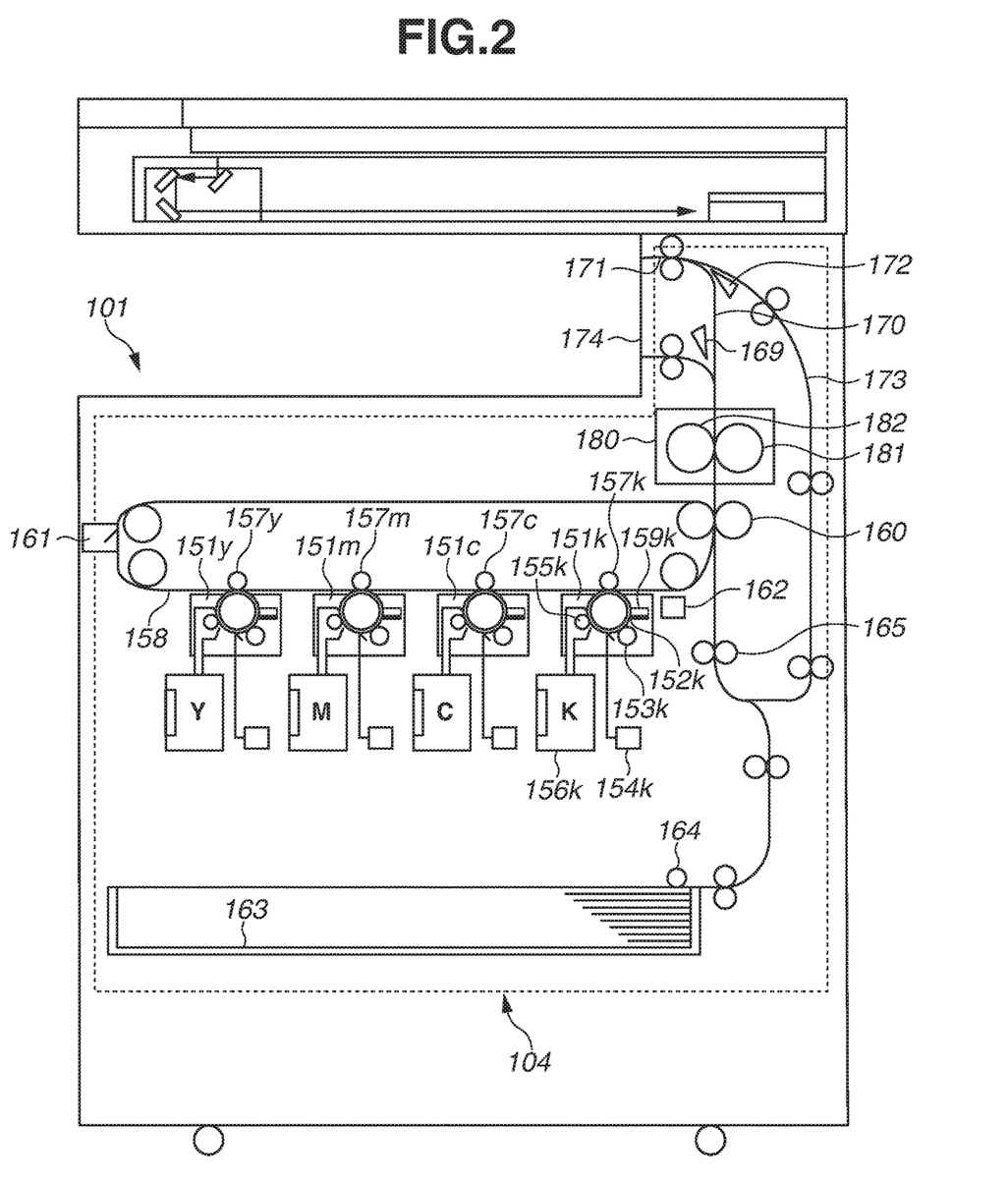
FIG. 2 is a diagram illustrating details of an example of a printer device.

FIG. 2 is a diagram illustrating details of an example of the printer device 104. FIG. 2 illustrates an overall sectional view of the printer device 104. The printer device 104 includes a process unit 151$k$, a process unit 151$y$, a process unit 151$m$, and a process unit 151$c$.

The process unit 151$k$ is a process unit used for coloring of black on a print medium such as a sheet. The process unit 151$y$ is a process unit used for coloring of yellow on a print medium such as a sheet. The process unit 151$m$ is a process unit used for coloring of magenta on a print medium such as a sheet. The process unit 151$c$ is a process unit used for coloring of cyan on a print medium such as a sheet. The process unit 151$k$, the process unit 151$y$, the process unit 151$m$, and the process unit 151$c$ are hereinafter collectively referred to as the process unit 151.

The process unit 151$k$ includes a photosensitive drum 152$k$, a charging roller 153$k$, a developing device 155$k$, and an auxiliary charging brush 159$k$. The photosensitive drum 152$k$ is disposed at a center portion of the process unit 151$k$ and rotationally driven by a drum motor. The charging roller 153$k$ applies a high voltage to uniformly charge the surface of the photosensitive drum 152$k$. The developing device 155$k$ forms a visible toner image corresponding to an electrostatic latent image on the surface of the photosensitive drum 152$k$ by using a two-component developing agent including toner and carrier. The auxiliary charging brush 159$k$ charges transfer residual toner that has not been transferred by a primary transfer roller to have a uniform charge.

A laser scanner unit 154$k$ is a laser scanner unit that causes a laser that is modulated and output from a laser diode to scan in a longitudinal direction using a rotational polygon mirror. The laser scanner unit 154$k$ conducts a laser exposure in accordance with input image information on the uniformly charged photosensitive drum 152$k$ and forms an electrostatic latent image thereon.

A toner bottle 156$k$ is a bottle that is filled with toner and is used to supply toner to the developing device 155$k$. A primary transfer roller 157$k$ is a roller for primarily transferring toner onto an intermediate transfer member 158, which is an endless-belt-like member, so that colors of yellow, magenta, cyan, and black are sequentially superimposed on the intermediate transfer member 158.

Each of the process units 151$y$, 151$m$, and 151$c$ includes a photosensitive drum, a charging roller, a developing device, and an auxiliary charging brush, which are similar to the photosensitive drum 152$k$, the charging roller 153$k$, the developing device 155$k$, and the auxiliary charging brush 159$k$, respectively. A laser scanner unit, a toner bottle, and a primary transfer roller, which are similar to the laser scanner unit 154$k$, the toner bottle 156$k$, and the primary transfer roller 157$k$, respectively, are arranged around each of the process units 151$y$, 151$m$, and 151$c$.

The toner image primarily transferred onto the intermediate transfer member 158 is secondarily transferred onto a sheet by secondary transfer rollers 160. Residual toner that has not been transferred by the secondary transfer rollers 160 and a toner image for image quality adjustment that is not intended to be transferred onto a sheet are cleaned by an intermediate transfer member cleaner 161. A pattern density detection sensor 162 is a sensor that detects a shading change of a pattern formed on the intermediate transfer member 158. The adjustment of the quality of an image to be printed on a print medium is achieved by feeding the detection result obtained via the pattern density detection sensor 162 back to the developing device 155 and the laser scanner unit 154.

Sheets, i.e., print media, are stored in a sheet cassette 163 and fed by a paper feed roller 164 at a timing when a leading edge of a toner image matches a leading edge of a sheet when the toner image is transferred onto the sheet by the printer device 104. Then, the sheet is sent to the secondary transfer roller 160 after a skew of the sheet is corrected by registration roller 165.

After the toner image is transferred by the secondary transfer rollers 160, the toner image is thermally fixed onto the sheet by a fixing unit 180 which includes a fixing film unit 182 and a pressure roller 181. After that, the conveyance direction of the sheet is switched by a discharge flapper 169.

In the case of forming an image on one surface of a sheet, the sheet is conveyed to a paper discharge unit 174.

In the case of forming an image on both surfaces of a sheet, the sheet is conveyed to a double-sided reversing path 170. The sheet conveyed to the double-sided reversing path 170 is further conveyed to the registration rollers 165 via a double-sided conveyance path 173 by reversing rollers 171 and a reversing flapper 172. Then, after an image is formed on the back surface of the sheet, the sheet is conveyed to the paper discharge unit 174.

(Details of Controller)

Figure 3:
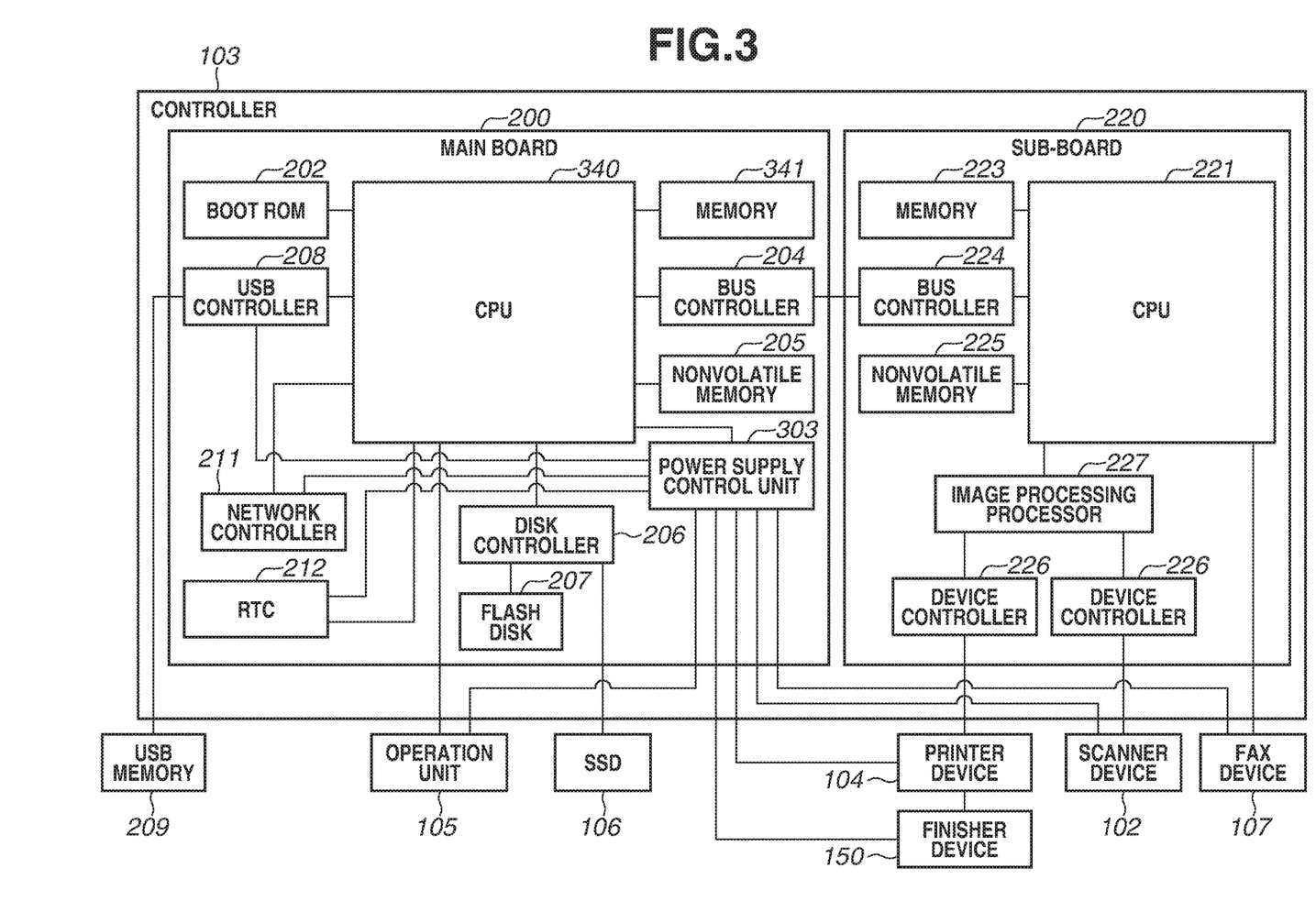
FIG. 3 is a diagram illustrating details of an example of a controller.

FIG. 3 is a diagram illustrating details of an example of the controller 103. A hardware configuration of the controller 103 will be described with reference to FIG. 3.

The controller 103 includes a main board 200 and a sub-board 220. The main board 200 includes a central processing unit (CPU) 340, a boot read-only memory (ROM) 202 including a boot program, and a memory 341 which is a storage device such as a random access memory (RAM) functioning as a work memory for the CPU 340. The memory 341 is an example of a second storage unit.

The main board 200 also includes a bus controller 204 including a function of bridging with an external bus, a nonvolatile memory 205 in which stored data is not lost even when a power supply is interrupted, and a disk controller 206 that controls a storage device. The nonvolatile memory 205 is, for example, a storage device such as a ROM.

The main board 200 also includes a flash disk 207, such as an SSD, which is a storage device including a semiconductor device, and a universal serial bus (USB) controller 208 capable of controlling a USB. The main board 200 is connected to a USB memory 209 via the USB controller 208. The main board 200 is also connected to the SSD 106 via the disk controller 206. The main board 200 is also connected to the operation unit 105, and thus can receive information and instructions input via the operation unit 105.

The main board 200 also includes the power supply control unit 303 (e.g., a complex programmable logic device (CPLD) or a complex programmable logic circuit) that controls an interrupt from each element and power supply to each element. The CPU 340 is connected to the power supply control unit 303.

The main board 200 also includes a network controller 211 and a real-time clock (RTC) 212. The main board 200 is connected to each of the printer device 104, the finisher device 150, the scanner device 102, and the FAX device 107 via the power supply control unit 303. The main board 200 is also connected to each of the printer device 104, the finisher device 150, the scanner device 102, and the FAX device 107 via the sub-board 220. The CPU 340 is connected to the USB controller 208. The CPU 340 is also connected to the operation unit 105 including a software switch.

The sub-board 220 includes a CPU 221 that controls the entire sub-board 220, a memory 223 which is a storage device, such as a RAM, functioning as a work memory for the CPU 221, and a bus controller 224 including a bridge function with an external bus. The sub-board 220 also includes a nonvolatile memory 225 which is a storage device, such as a ROM, in which stored information is lost even when a power supply is interrupted.

The sub-board 220 also includes an image processing processor 227 which is an arithmetic device used for real-time digital image processing, and a device controller 226 used for controlling connected devices. The CPU 221 controls the scanner device 102 and the printer device 104, which are external devices of the controller 103, via the image processing processor 227 and the device controllers 226. The CPU 221, for example, exchanges digital image data with the scanner device 102 and the printer device 104 via the image processing processor 227 and the device controllers 226. A sheet (sheet device) discharged from the printer device 104 is processed by the finisher device 150. The CPU 221 directly controls the FAX device 107.

The hardware configuration of the controller 103 is not limited to the configuration illustrated in FIG. 3. For example, the controller 103 may include hardware such as a chip set, a bus bridge, and a clock generator for the CPU 340 and the CPU 221.

Processing for copying an image onto a sheet will be described as an example of processing to be performed by the controller 103.

When a user instructs the CPU 340 to copy an image onto a sheet via the operation unit 105, the CPU 340 transmits an image read instruction to the scanner device 102 via the CPU 221. The scanner device 102 optically scans an image from a paper document, convers the image into digital image data, and outputs the digital image data to the image processing processor 227 via the device controller 226. The image processing processor 227 performs direct memory access (DMA) transfer for transferring the input digital image data to the memory 223 via the CPU 221, and temporarily stores the digital image data.

Upon confirming that a predetermined amount or all of the digital image data is stored in the memory 223 via the CPU 221, the CPU 340 transmits an image output instruction to the printer device 104 via the CPU 221.

The CPU 221 notifies the image processing processor 227 of the address of the image data temporarily stored in the memory 223. The image data stored in the memory 223 is transmitted to the printer device 104 via the image processing processor 227 and the device controller 226 in accordance with a synchronization signal from the printer device 104.

The printer device 104 prints the digital image data on a sheet as a print medium.

In the case of printing a plurality of copies, the CPU 340 stores the image data temporarily stored in the memory 223 into the SSD 106. This enables the controller 103 to send images for the second and subsequent copies from the SSD 106 or the memory 223 to the printer device 104 without acquiring the images from the scanner device 102.

Figure 5:
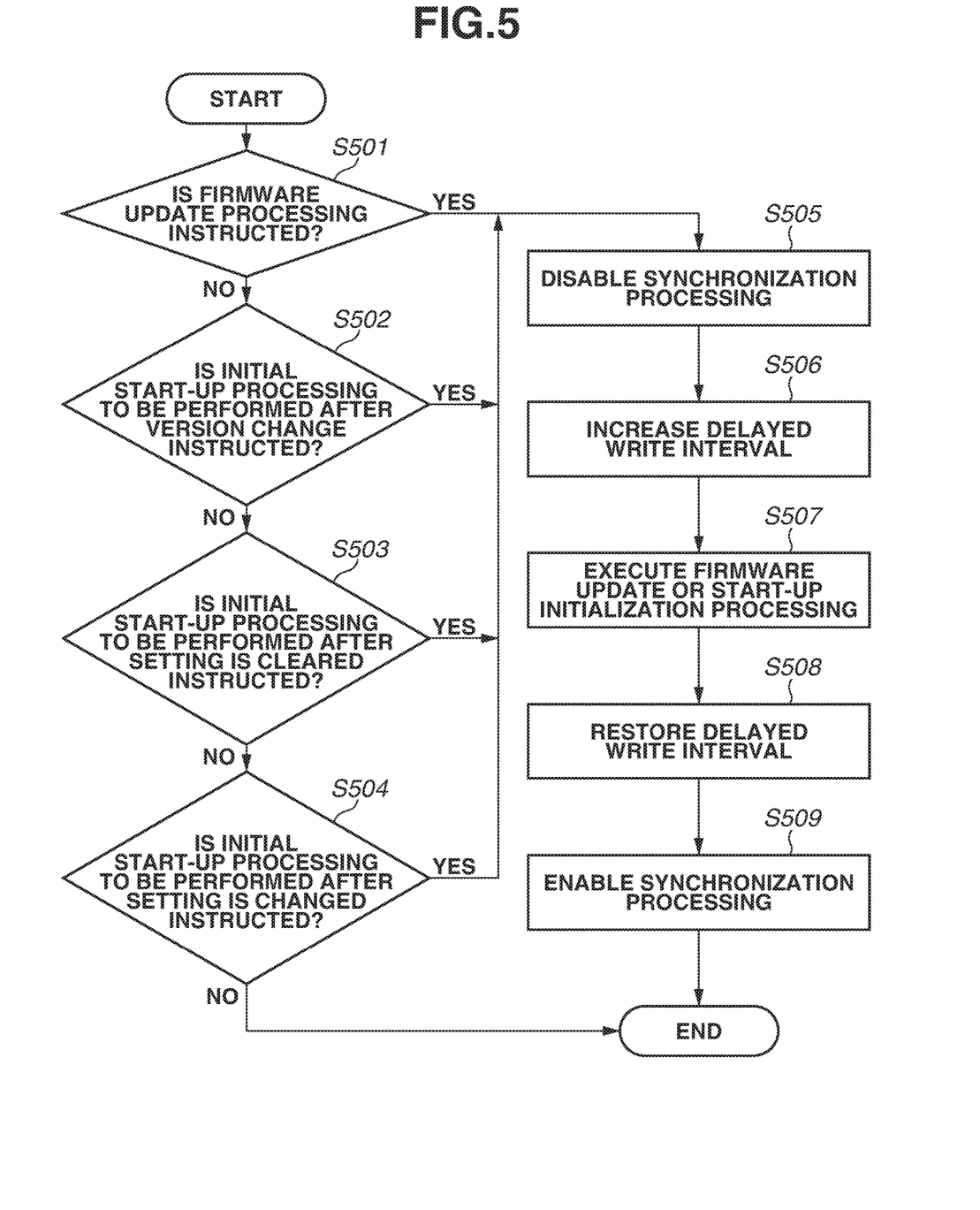
FIG. 5 is a flowchart illustrating an example of processing to be performed by the image forming apparatus.

The CPU 340 executes processing in accordance with programs stored in the nonvolatile memory 205, the SSD 106, or the like, thereby implementing the functions of the image forming apparatus 101 described above in the "Functions of Image Forming Apparatus" section, processing in a flowchart of FIG. 5, and the like.

(Power Supply Configuration)

Details of the power supply of the image forming apparatus 101 according to the present exemplary embodiment will be described.

Figure 4:
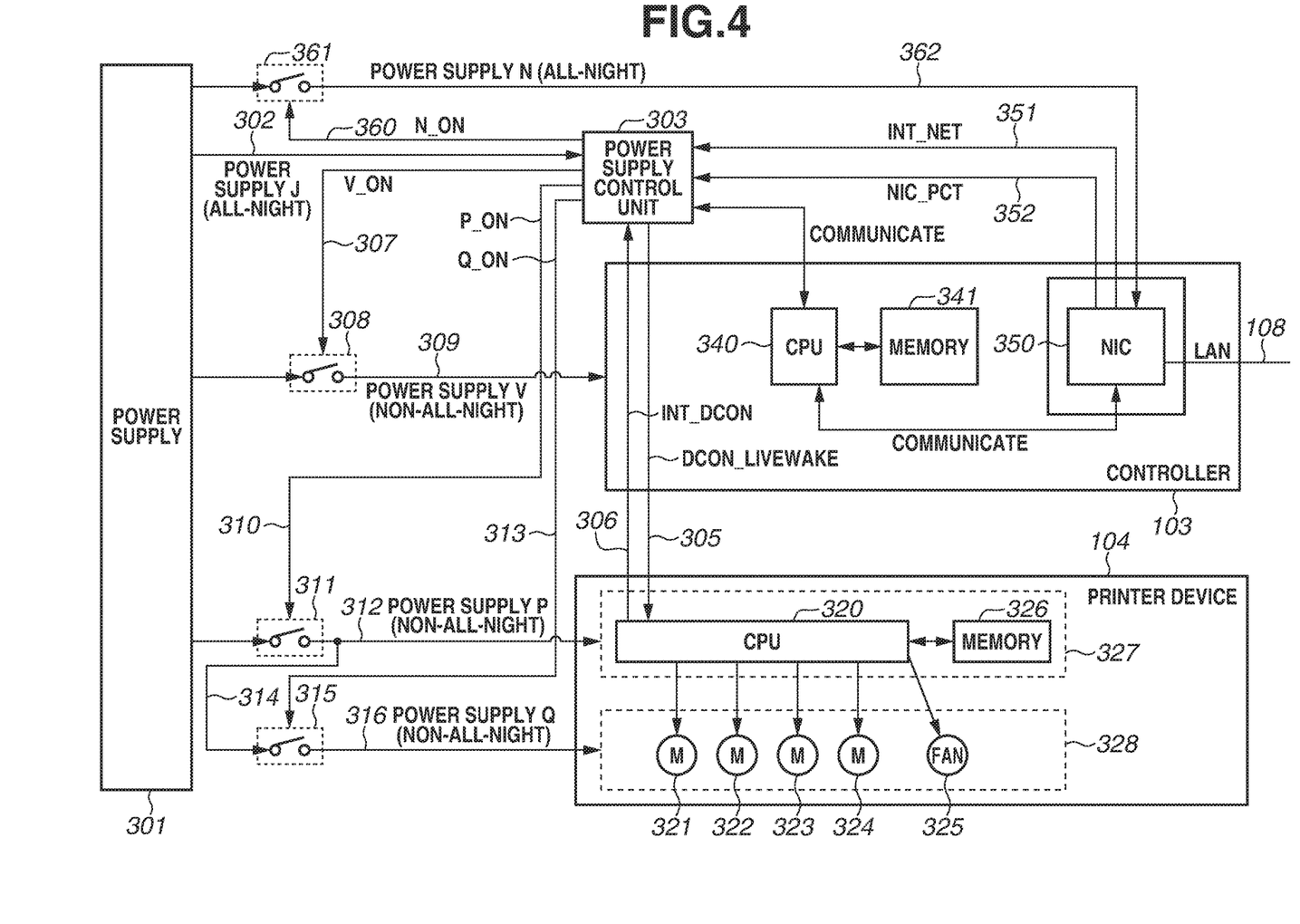
FIG. 4 is a diagram illustrating details of an example of a power supply of an image forming apparatus.

FIG. 4 illustrates details of an example of the power supply of the image forming apparatus 101. The relationship among the controller 103, the printer device 104, the power supply control unit 303, and a power supply 301 in the image forming apparatus 101 will be described below with reference to FIG. 4. The power supply 301 is a power supply such as a commercial power supply to feed power to the image forming apparatus 101.

In the example illustrated in FIG. 4, the power supply control unit 303 is supplied with power from the power supply 301 via a power supply line J 302 which is an example of a first power supply line. Even when the power supply switch 110 is switched off, the power supply control unit 303 is energized, thereby enabling the power supply control unit 303 to perform power control.

The power supply control unit 303 executes processing in accordance with a program for executing desired processing. The processing to be performed by the power supply control unit 303 will be described. The power supply control unit 303 switches a relay switch 308 upon receiving an IO signal V_ON (a power supply control signal 307), which is an example of a first power supply control signal, thereby controlling power feeding to the controller 103 from the power supply 301 via a power supply line V 309 which is an example of a second power supply line. The power supply control unit 303 receives, from the CPU 340, an instruction to perform processing at the time of start-up of a timer, and executes processing instructed by the CPU 340 at the time of start-up of the timer.

Further, the power supply control unit 303 switches a relay switch 311 in accordance with an IO signal P_ON (a power supply control signal 310) which is an example of a second power supply control signal. As a result, power feeding from the power supply 301 to a printer control unit 327 of the printer device 104 via a power supply line P 312, which is an example of a third power supply line, is controlled. The printer control unit 327 is a logic-system circuit of the printer device 104 and includes a CPU 320 and a memory 326.

The power supply control unit 303 switches a relay switch 315 in accordance with an IO signal Q_ON (a power supply control signal 313) which is a sub-signal of the second power supply control signal. As a result, power feeding from the power supply 301 to the print unit 328 of the printer device 104 via a power supply line Q 316, which is a sub-line of the third power supply line, is controlled. The print unit 328 is a high-load system device of the printer device 104 and includes fixing units 321 to 324 and a fan 325 for the marking unit 141. The print unit 328 includes not only the above-described mechanism units but also the mechanism units of the printer device 104 described above with reference to FIG. 2.

The power supply line Q 316 does not necessarily need be a sub-line of the power supply line P 312 but instead may be drawn from the power supply 301. The relay switch 315 is controlled by the power supply control unit 303, but instead may be controlled by the CPU 340 or the like. The print unit 328 may include the paper feed unit 142, the marking unit 141, and the paper discharge unit 143.

The power supply control unit 303 activates a predetermined IO signal based on an instruction from the CPU 340. One of the IO signals that can be controlled by the power supply control unit 303 is a DCON_LIVEWAKE signal 305 which is connected to the CPU 320 of the printer device 104.

When the power supply of the printer device 104 is turned on in a state where the signal is asserted (enabled), the printer device 104 is restored without performing specific processing for controlling a movable unit or using power. Examples of the specific processing include a rotation operation of a motor, a roller, a polygon mirror, or the like, temperature control of the fixing units 321 to 324, which are drums, and heat exhausting processing to be performed by the fan 325. Like the printer device 104, the power supply of the scanner device 102 is controlled by the power supply control unit 303. Specifically, the power supply control for the scanner device 102 is performed by the power supply control unit 303 in the same manner as that for the printer device 104.

Power feeding for each block as illustrated in FIG. 4 can be implemented by, for example, forming the relay switch 308 into a two-system switch configuration such that in a sleep state, only the relay switch connected to a block which is turned off, while the other relay switch is controlled to be kept on. The sleep state is one of power saving states that can be taken by the image forming apparatus 101. Assume that the CPU 340 stores, for example, information indicating the state of the image forming apparatus 101 in the memory 341. Accordingly, the CPU 340 updates, for example, the information stored in the memory 341, and performs processing corresponding to each state to thereby switch the state of the image forming apparatus 101.

Assume that in a shut-down state, the relay switches of the both systems are turned off. The shut-down state is one of the possible states in which the image forming apparatus 101 can be, and indicates a state where the power supply is turned off. In this case, the power supply control signal is not a binary signal, but a multi-valued control signal depending on the energized state. The power states including the sleep state and the shut-down state can be implemented by the control processing as described above.

More specifically, the power supply control unit 303 switches a relay switch 361 in accordance with an IO signal N_ON (a power supply control signal 360), which is an example of a third power supply control signal, thereby controlling power feeding to a network interface card (NIC) 350 from the power supply 301 via a power supply line N 362 which is an example of the third power supply line. The NIC 350 included in the controller 103 is individually supplied with power from the power supply 301. Unlike other non-all-night power supplies, the power supply line N 362 is supplied with power in the sleep state as well as in a normal state, and thus enables wake-up of the network. Further, at the time of shut-down, no power is fed to the NIC 350 unless a setting such as Wake On LAN is effective. Power is fed to the power supply line N 362, which includes the relay switch 361 therein, except in the off state.

(Power Supply Monitoring 1 by Power Supply Control Unit: Power Feeding at Start-up)

Next, power supply control processing at the time of start-up of the image forming apparatus 101 will be described. To use the image forming apparatus 101, an operator turns on the power supply switch 110. Then, the power supply control unit 303 detects that the power supply of the image forming apparatus 101 is ON based on the energization from the power supply line J 302. The power supply control unit 303 issues power supply switch control signals (307, 310, and 313) to thereby turn on the relay switches 308, 311 and 315, so that power is supplied from the power supply 301 to the entire apparatus. The power supply control unit 303 supplies power to the entire system according to the power supply to be executed when the power supply is ON. More specifically, the power supply control unit 303 energizes the controller 103, the printer device 104, and the scanner device 102 via respective DC power supply paths. Then, the CPUs of the printer device 104 and the scanner device 102 start an initialization operation.

After the processing to be performed when the power supply switch is turned on is carried out, the CPU 340 of the controller 103 initializes the hardware of the image forming apparatus 101. Examples of processing associated with the initialization of the hardware include register initialization, interruption initialization, registration of device drivers at the time of kernel startup, and initialization of the operation unit 105. Next, the CPU 340 initializes the software of the image forming apparatus 101. Examples of processing associated with the initialization of the software of the image forming apparatus 101 include a call of an initialization routine for each library, start-up of processes and threads, start-up of software services for communication with the printer device 104 and the scanner device 102, and a drawing operation of the operation unit 105. Then, the CPU 340 causes the image forming apparatus 101 to shift to a standby state. The standby state is one of the power saving states of the image forming apparatus 101, and indicates a state of waiting for reception of an instruction.

(Power Supply Monitoring 2 by Power Supply Control Unit: Power Feeding in Normal State)

Next, power feeding in the image forming apparatus 101 in the normal state in which the printer device 104 and the scanner device 102 are not used will be described. The normal state is one of the possible states that the image forming apparatus 101 can be in The normal state includes not only a state where power is fed to all units in the image forming apparatus 101, but also, for example, a state where no power is fed to the printer device 104 when printing is not carried out. Even in the normal state, when the operation unit 105 is not turned on and the user is not present in front of the image forming apparatus 101, no power may be fed to the scanner device 102.

Examples of the state of the image forming apparatus 101 include an operation waiting state of waiting for an operation when power is supplied to the printer device 104 and the scanner device 102. In the operation waiting state, the operations of motors and polygon mirrors for printing, a temperature control for a transfer unit for printing, and an operation to detect a home position for reading may be inhibited.

(Power Supply Monitoring 3 by Power Supply Control Unit: Power Feeding during PDL Printing).

Next, a power feeding operation of the image forming apparatus 101 in a PDL print state in which the printer device 104 and the scanner device 102 are used will be described. Power supply ON/OFF control of the printer device 104 by using the image print function will be described.

The CPU 340 receives data in the memory 341 from the computer 109 via the LAN 108. The CPU 340 analyzes the received data, and in the case of executing the image print function, the CPU 340 generates a print job.

The CPU 340 sends a notification to the power supply control unit 303 to switch the relay switch 311 by the power supply control signal 310, so that the power supply 301 feeds power to the printer device 104 via the power supply line P 312. When power feeding to the printer device 104 is started and the printer device 104 is brought into an operable state, the CPU 340 executes the print job via the printer device 104. The CPU 340 transmits data for the print job to the memory 341 and the CPU 221. The CPU 221 transmits the received data to the printer device 104. The printer device 104 performs printing based on the received data, and after completion of printing, the printer device 104 notifies the CPU 340 of the printing result. After completion of printing, the CPU 340 turns off the relay switch 311 by the power supply control signal 310 via the power supply control unit 303, and turns off the power supply of the printer device 104.

(Power Supply Monitoring 4 by Power Supply Control Unit: Power Feeding during Shifting to Sleep State).

Processing for shifting to the sleep state of the controller 103 will be described. When the standby state continues for a predetermined time period, the CPU 340 causes the image forming apparatus 101 to shift to the sleep state. The CPU 340 notifies the power supply control unit 303 of shifting to the sleep state. Then, the power supply control unit 303 changes power feeding to the controller 103. Power feeding for each block is implemented by, for example, forming the relay switch 308 into a two-system switch configuration such that in the sleep state, only the relay switch connected to a block for which the power supply is turned off in the sleep state is turned off, while the other relay switch is controlled to be kept on.

(Power Supply Monitoring 5 by Power Supply Control Unit: Power Feeding in Sleep State)

Power feeding processing in the sleep state of the image forming apparatus 101 will be described. The sleep state is a state in which, while power consumption is suppressed, the startup time period can be shortened as compared to that at a startup from the shut-down state. The CPU 340 causes the image forming apparatus 101 to shift to the sleep state, for example, when a predetermined time period has elapsed in a state where the user performs no operation, a power saving key on the operation unit 105 is pressed, or a set time is reached. In the sleep state, power is fed to the memory 341, the disk controller 206, the network controller 211, the RTC 212, the USB controller 208, and the like. In the sleep state, power is also fed to the power saving key on the operation unit 105, a part of the FAX device 107, various sensors, and the like. However, because sleep restoration factors that can cause the apparatus to restore from sleep vary depending on systems, the power feeding method in the sleep state is not limited to the configuration as described above.

A software operation at the time of sleep restoration will be described. In the sleep state, upon receiving one or more interruptions by the network, the RTC 212 which detects a timer or alarm, the FAX device 107 which detects an incoming call or off-hook operation, a software switch, various sensors, a USB of which insertion/removal and communication is detected, or the like, the power supply control unit 303 starts power feeding. The power supply control unit 303 notifies the CPU 340 of the cause of the interruption. Upon receiving the notification, the CPU 340 performs processing for returning the state of software to the normal state, i.e., sleep restoration processing.

(Power Supply Monitoring 6 by Power Supply Control Unit: Power Feeding during Restoring from Sleep State).

Processing to be performed during restoring from the sleep state of the controller 103 will be described. Upon receiving a power saving key pressing event, which is a sleep restoration factor, from the power supply control unit 303 during the sleep state, the CPU 340 is restored from the sleep state. The CPU 340 notifies the power supply control unit 303 of the sleep restoration event. After that, the power supply control unit 303 issues the power supply control signals 307 and 310 to turn on the relay switches 308 and 311. As a result, power feeding to the controller 103, the printer device 104, and the scanner device 102 is started. As the power supply control signal to be issued for the scanner device 102, the signal identical to the power supply control signal for the printer device 104 may be used, and other signals may also be used.

For example, after completion of the instructed print job, the CPU 340 shifts to the sleep state again. The CPU 340 notifies the power supply control unit 303 of shifting to the sleep state. Further, the power supply control unit 303 issues the power supply control signal 310 to turn off the relay switch 311, thereby interrupting power feeding to units other than the controller 103 in the image forming apparatus 101. Consider a case where a network receiving event, which is a sleep restoration factor that causes restoration from the sleep state, has occurred in the sleep state. Upon reception of the sleep restoration factor, the power supply control unit 303 issues the power supply control signal 307 to turn on the relay switch 308, so that power feeding to the controller 103 is started. Further, the CPU 340 causes the image forming apparatus 101 to be restored from the sleep state. No power may be fed to the printer device 104 and the scanner device 102 when no job is generated, or when there is no need to acquire device information.

(Cache Areas of Controller and SSD)

Next, cache areas of the controller 103 and the SSD 106 according to the present exemplary embodiment will be described. The term "cache area" refers to a storage area used to temporarily store data. The cache area is, for example, a storage area within a storage device, such as the memory 341 or a RAM in the SSD 106.

To store data in the SSD 106, an application to be implemented by execution of a program by the CPU 340 stores the data in the memory 341 and issues a write instruction to write data into the SSD 106 to an operating system (OS). The OS is implemented by execution of a program by the CPU 340. The OS returns a response (a response indicating that the write instruction has been received) to the application, with the data remaining stored in the memory 341. The OS issues a write event at any timing, and sends the data stored in the cache area to the SSD 106 via the disk controller 206.

Upon reception of the data from the CPU 340, firmware of the SSD 106 that is implemented by execution of a program by a CPU in the SSD 106 writes the data to the RAM in the SSD 106. The firmware of the SSD 106 issues a write event at any timing, and writes the data stored in the RAM of the SSD 106 into a flash memory of the SSD 106. Although the SSD 106 includes, as hardware components, the CPU, RAM, and flash memory in the present exemplary embodiment, the SSD 106 may include other elements.

(Characteristics and Issues of Storage Device Using Flash Memory)

Characteristics of a storage device, like the SSD 106, using a flash memory as a storage will be described.

One of the characteristics of the storage device is that in the case of writing data into the storage, write target data may be written to each block with a predetermined size after the write target data is included in the block, instead of directly writing the write target data to the storage. The size of the block is, for example, a default value of 4 KG, and can be changed within a range from 1 KB to 1024 KB. In the present exemplary embodiment, an area (cache area) in which data to be written to the SSD 106 is temporarily stored is prepared in the memory 341.

One of the characteristics of the storage device is that the storage device has an upper limit for the total write capacity of data to be written to the storage. The upper limit of the total write capacity of the SSD is about 74 TB for an SSD of a 128 GB. As the capacity of the SSD increases, the total write capacity also increases in proportion to the capacity of the SSD.

Next, a method in which the CPU 340 writes data to the SSD 106 will be described.

As a method in which the CPU 340 writes data to the SSD 106, a synchronous write method is known. An example of the synchronous write method is a data write method for writing data by explicitly synchronizing a cache area in which the write target data is stored with the SSD 106 (synchronizing the content of portions related to the write target data). The synchronous write method is an example of a first method. In the synchronous write method, an application to be implemented by execution of a program by the CPU 340 explicitly synchronizes the cache area with the SSD 106. Such an application issues an instruction to explicitly synchronize the cache area with the SSD 106, so that all data to be written in one write process in response to the instruction is written to the SSD 106.

Data write processing by the synchronous write method is implemented, for example, in the following manner. For example, in the case of mounting a file system in each partition of the SSD 106 by using a system such as UNIX® and Linux®, the CPU 340 mounts the file system in a synchronous type using a -o sync option. In such a manner, in the case where the CPU 340 writes data to the cache area of the memory 341, write processing by the synchronous write method is performed. The cache area of the memory 341 is an example of a storage area in a second storage device.

Data write processing by the synchronous write method is also implemented, for example, in the following manner. For example, in the case of opening a file using a system, such as UNIX® and Linux®, the CPU 340 opens the file in a synchronous type using an O_SYNC state flag. Thus, in the case where the CPU 340 writes data to the cache memory of the memory 341, write processing by the synchronous write method is performed.

Data write processing by the synchronous write method is also implemented, for example, in the following manner. For example, the CPU 340 can also implement data write processing by the synchronous write method by calling a synchronous type application programming interface (API), such as sync, fsync and fdatasync, by using a system such as UNIX® and Linux®.

Processing for writing data into the SSD 106 by the synchronous write method will be described. A device driver for the OS which is implemented by execution of a program by the CPU 340 receives, from an application, a synchronous write instruction to write data to the SSD 106. The device driver transmits the data stored in the cache area of the memory 341 to the SSD 106 via the disk controller 206. The firmware of the SSD 106 writes the transmitted data to the cache area on the RAM in the SSD 106. The firmware of the SSD 106 performs the following processing in the case of writing the write target data stored in the cache area to a flash memory as a storage. That is, even if the same amount of write target data as the block size is not stored in the cache area, the firmware of the SSD 106 writes the block including the data stored in the cache area to the SSD 106.

Immediately after transmitting the data stored in the cache area of the memory 341 to the SSD 106, the CPU 340 issues a flash cache command, which is an example of an Advanced Technology Attachment (ATA) command, to the SSD 106. Upon reception of the flash cache command, the firmware of the SSD 106 writes the data stored in the cache area on the RAM in the SSD 106 to a cell of the flash memory in the SSD 106. The firmware of the SSD 106 transmits a response to the flash cache command to the CPU 340. Upon reception of the response to the flash cache command, the CPU 340 returns a result to the application that has sent an instruction to write data.

As a method in which the CPU 340 writes data to the SSD 106, there is a delayed write method. The delayed write method is a method for writing data, in which write target data is continuously stored into a cache area for a predetermined period, and after a lapse of the period, processing for synchronizing the cache area with the SSD 106 is repeated at intervals of the period. That is, data that is instructed to be written is accumulated in the cache area during a predetermined interval. Accordingly, when a plurality of write instructions is issued during the predetermined interval, the write target data respectively corresponding to the plurality of write instructions may be stored in the cache area. After a lapse of the predetermined interval, the data stored in the cache area is collectively written to the SSD 106. As a result, the frequency of data write operations on the SSD 106 is reduced as compared with the synchronous write method in which the data write operation on the SSD 106 is performed once in response to a single write instruction.

A method for writing data to the SSD 106 by the delayed write method will be described. Upon reception of a data write instruction to write data to the SSD 106 from an application, the OS that is implemented by execution of a program by the CPU 340 starts storing data into the cache area of the memory 341 and returns a response to the application. The OS transmits the data stored in the cache area of the memory 341 to the SSD 106 at predetermined intervals. The SSD 106 writes the transmitted data to the flash memory in the SSD 106. The interval at which the OS transmits data to the SSD 106 is, for example, an interval of five seconds, which is a default value for /proc/sys/vm/dirty_writeback_centisecs, in the case of using Linux®.

An issue is an increase in the total write capacity of data, which can be generated when the CPU 340 writes data to the SSD 106 by the synchronous write method, will be described.

When the data write processing to write data to the SSD 106 is executed by the synchronous write method, a data write operation corresponding to the size (4 KB) of a block occurs even if the amount of data in a single data write operation is less than the size (4 KB) of the block. As a result, if a huge number of files having a capacity smaller than the block size is written, the total write capacity of data to be written to the SSD 106 considerably increases.

For example, in the case of writing update firmware of 1.5 GB to the SSD 106, assume that 1.5 million files each having a size of 1 KB are written thereto. Assume in this case that data is written to the SSD 106 for each file by the synchronous write method. If each block has a size of 4 KB as a default value, data write processing of 4 KB is executed to write one file of 1 KB. As a result, the size of data to be actually written to the SSD 106 is 6 GB with respect to data in the firmware with a size of 1.5 GB.

If the block size, which is the unit of data write to the SSD 106, is set to 1024 KB according to a file of images, moving images, or the like with a large capacity, when a file of 1 KB is written by the synchronous write method, write processing to write data of 1024 KB is actually executed. As a result, the size of data to be actually written is 1536 GB (about 1.5 TB) with respect to data in the firmware with a size of 1.5 GB.

A storage device in which a flash memory is used as a storage, like the SSD 106, has a limitation in the total amount of data that can be written. Accordingly, if a huge number of files having a capacity smaller than the block size are written by the synchronous write method, data having a size larger than the total capacity of write target data is written, which leads to a reduction in the life of the storage device.

For example, when the size of data to be actually written to the firmware of 1.5 GB is 1536 GB (about 1.5 TB), the total write capacity reaches about 75 TB by only 50 times of updates. The total write capacity exceeds the capacity of data that can be written to the 128 GB SSD. That is, in the case of using the 128 GB SSD, the SSD may reach the end of life when the firmware is updated only 50 times.

(Description of Processing of Image Forming Apparatus)

FIG. 5 is a flowchart illustrating an example of processing to be performed by the image forming apparatus 101. In the present exemplary embodiment, the image forming apparatus 101 executes processing for changing conditions for data write so as to reduce the amount of data to be written to the SSD 106, before executing specific processing as data write processing. The conditions for data write are hereinafter referred to as write conditions. Examples of the write conditions include conditions as to whether data write in a certain method is prohibited, what kind of parameter values are used in data write in a certain method, and which block size is used to write data to the storage unit. Further, the image forming apparatus 101 executes processing for restoring the write conditions to original conditions after completion of the specific processing.

In the example illustrated in FIG. 5, the specific processing is one of update processing for updating the firmware on the SSD 106, initial start-up processing to be performed after version change of the image forming apparatus 101, and initial start-up processing to be performed after the setting of the image forming apparatus 101 is cleared or changed. These processing examples are processing in which writing of a huge number of files having a size smaller than the block size may occur. In the initial start-up processing to be performed after version change of the image forming apparatus 101, writing of a large number of files may occur in association with the version change. In the initial start-up processing to be performed after the setting of the image forming apparatus 101 is cleared (initialized) or changed, a huge number of files which have a capacity smaller than the block size and are generated in association with the initialization may be generated.

In step S501, the CPU 340 determines whether update processing for updating the firmware on the SSD 106 is instructed. If the CPU 340 determines that the update processing for updating the firmware on the SSD 106 is instructed (YES in step S501), the processing proceeds to step S505. If the update processing for updating the firmware on the SSD 106 is not instructed (NO in step S501), the processing proceeds to step S502.

In step S502, the CPU 340 determines whether the initial start-up processing to be performed after the version of the image forming apparatus 101 is changed is instructed. If the CPU 340 determines that the initial start-up processing to be performed after the version of the image forming apparatus 101 is changed is instructed (YES in step S502), the processing proceeds to step S505. If the CPU 340 determines that the initial start-up processing to be performed after the version of the image forming apparatus 101 is changed is not instructed (NO in step S502), the processing proceeds to step S503.

In step S503, the CPU 340 determines whether the initial start-up processing to be performed after the setting of the image forming apparatus 101 is cleared is instructed. If the CPU 340 determines that the initial start-up processing to be performed after the setting of the image forming apparatus 101 is cleared is instructed (YES in step S503), the processing proceeds to step S505. If the CPU 340 determines that the initial start-up processing to be performed after the setting of the image forming apparatus 101 is cleared is not instructed (NO in step S503), the processing proceeds to step S504.

In step S504, the CPU 340 determines whether the initial start-up processing to be performed after the setting of the image forming apparatus 101 is changed is instructed. If the CPU 340 determines that the initial start-up processing to be performed after the setting of the image forming apparatus 101 is changed is instructed (YES in step S504), the processing proceeds to step S505. If the CPU 340 determines that the initial start-up processing to be performed after the setting of the image forming apparatus 101 is changed is not instructed (NO in step S504), the processing illustrated in FIG. 5 is terminated.

In step S505, the CPU 340 executes processing for prohibiting data write to the SSD 106 by the synchronous write method, before starting the processing that is determined to be instructed in any of steps S501 to S504. Thus, the CPU 340 adjusts the write conditions as conditions indicating that the data write to the SSD 106 in the synchronous write method is prohibited. The CPU 340 prohibits the data write to the SSD 106 in the synchronous write method, for example, in the following manner.

That is, in the case of mounting a file system in each partition of the SSD 106 by using, for example, a UNIX® or Linux® system, the CPU 340 mounts the system in an asynchronous type without using the -o sync option.

Next, the CPU 340 opens a file to be written in the asynchronous type by using a flag, an environment variable, and a wrapped open function, instead of using the O_SYNC option, and stores the data on the file into the cache area of the memory 341. For example, in step S505, the CPU 340 updates flag information stored in the memory 341 with information indicating that the synchronous write method is prohibited. Further, when the value of the flag information indicates information indicating that the synchronous write method is prohibited, the CPU 340 opens a file without using the O_SYNC option.

Further, the CPU 340 disables the execution of synchronization processing by using the flag information, environment variable, wrapped sync, fsync, and fdatasync functions, and the like. For example, in a case where the flag information stored in the memory 341 is information indicating that the synchronous write method is prohibited, the CPU 340 does not call the sync, fsync, and fdatasync functions. In a case where the flag information stored in the memory 341 is information indicating that the synchronous write method is prohibited, the CPU 340 may the wrapped sync, fsync, and fdatasync functions so as to return without performing any processing. Further, the CPU 340 includes the data stored in the cache area in a block, for example, by the delayed write method, without using the sync, fsync, fdatasync functions, and stores the data into the flash memory of the SSD 106.

The processing as described above enables the CPU 340 to prohibit data write to the SSD 106 in the synchronous write method.

The CPU 340 may also perform the following processing. That is, the CPU 340 loads objects in which sync, fsync, and fdatasync are defined as "weaksynbol" in the normal state. Then, in the processing of step S505, the CPU 340 loads objects having entities of empty functions of sync, fsync, and fdatasync. Thus, the CPU 340 can prohibit synchronization processing with the SSD 106 even in a case where the API such as sync, fsync, or fdatasync is called.

In step S506, the CPU 340 performs processing for setting the data write interval in the delayed write method to be longer than the current value. Thus, the CPU 340 adjusts the write conditions as conditions indicating that the write processing is periodically carried out with longer intervals in the delayed write method.

In the case of writing data in the delayed write method, as the interval with which the data write processing is carried out is longer, a larger amount of data is stored in the cache area of the memory 341. As a result, the ratio of write target data in the block to be actually written to the SSD 106 increases. Accordingly, the amount of unnecessary data to be written can be reduced, and thus the total capacity of data to be written to the SSD 106 can be reduced. Therefore, in the present exemplary embodiment, the CPU 340 executes the processing of step S506.

The CPU 340 increases the interval of data write to the SSD 106 in the delayed write method, for example, in the following manner. Assume that the data write to the SSD 106 in the delayed write method is carried out with intervals of five seconds. For example, in Linux®, the CPU 340 sets dirty_writeback_centisecs to a set value (e.g., 10, an upper limit of 30 seconds, etc.), thereby making it possible to set the data write interval in the delayed write method to the set value (i.e., 10 seconds or 30 seconds).

In step S507, the CPU 340 executes the processing that is determined to be instructed in any one of steps S501 to S504. In this case, the CPU 340 performs data write to the SSD 106 under the write conditions adjusted in steps S505 and S506.

After completion of the processing of step S507 (processing that is determined to be instructed in any of steps S501 to S504), the CPU 340 performs processing for restoring the write conditions to the original conditions in the following steps S508 and S509.

In step S508, after completion of the processing of step S507 (processing that is determined to be instructed in any one of steps S501 to S504), the CPU 340 restores the data write interval changed in step S506 in the delayed write method to the original data write interval.

The CPU 340 performs, for example, processing opposite to the processing of step S506. Specifically, the CPU 340 performs, for example in the case of Linux®, processing for setting/proc/sys/vm/dirty_writeback_centisecs to a default value of 5.

In step S509, the CPU 340 permits data write processing in the synchronous write method that is prohibited in step S505. For example, the CPU 340 updates the flag information stored in the memory 341 with information indicating that the data write processing in the synchronous write method is permitted.

The CPU 340 performs processing opposite to the processing of step S505. Specifically, the CPU 340 first mounts a file system in each partition of the SSD 106 with a sync option. Next, the CPU 340 sets the flag information to indicate that the data write processing in the synchronous write method is permitted, and opens a file to be written by using the O_SYNC option, thereby permitting the storage of data into the cache area. Further, the CPU 340 sets the flag information to indicate that the data write processing in the synchronous write method is permitted, and the utilization of sync, fsync, and fdatasync functions is permitted thereby.

In the present exemplary embodiment, the CPU 340 performs the processing of steps S505 and S506 as processing for reducing the total write capacity of data to be written to the SSD 106. However, in the image forming apparatus 101, the synchronous write method may be originally disabled and data write processing in the delayed write method may be performed. In this case, since it is useless to execute the processing of step S505, the CPU 340 may execute only the processing of step S506. In such a case, the CPU 340 may be configured to execute the processing of step S508 and not to execute the processing of step S509.

For example, in a case where it is determined that the firmware update processing is instructed in step S501 and the content of firmware for update indicates a plurality of files having a size of 1 KB, the CPU 340 may perform the following processing instead of the processing of steps S505 and S506. That is, the CPU 340 may perform processing for changing the block size, which is the unit of data write to the SSD 106, from 4 KB to 1 KB, prior to the processing of step S507. As a result, even when data is written by the synchronous write method, the CPU 340 reduces the difference between the block size and the actual file size, thereby making it possible to reduce the amount of unnecessary data to be written. As a result, the CPU 340 can reduce the total capacity of data to be written to the SSD 106. In this case, the CPU 340 may perform processing for restoring the block size to the original size after the processing of step S507.

In the present exemplary embodiment, when specific processing, such as the firmware update processing, is instructed, the CPU 340 performs the processing of steps S505 and S506 (as well as steps S508 and S509). However, the CPU 340 may determine whether to perform the processing of steps S505 and S506 (also steps S508 and S509) depending on whether the instructed processing indicates processing for writing a predetermined number or more of pieces of data having a size less than or equal to a predetermined size to the SSD 106.

The firmware to be updated may be limited only to the firmware on external devices, such as the printer device 104, the scanner device 102, the finisher device 150, and the FAX device 107. In this case, the number of write target files included in the firmware for update may be smaller than that in the case of updating other firmware (e.g., updating of the firmware on the SSD 106). In this case, even if the CPU 340 writes the firmware for update to the SSD 106 in the synchronous write method, the degree of increase in the total capacity of data to be written to the SSD 106 is small. Accordingly, the CPU 340 may determine whether to execute the processing of step S505 and S506 (also steps S508 and S509) based on the number of pieces of write target data to the SSD 106 corresponding to the instructed processing. The CPU 340 may determine to execute the processing of step S505 and S506 (also steps S508 and S509), for example, if the number of pieces of write target data corresponding to the instructed processing is greater than or equal to a predetermined threshold. In this case, if the number of pieces of write target data corresponding to the instructed processing is less than the predetermined threshold, the CPU 340 does not execute the processing of steps S505 and S506 (also steps S508 and S509).

In the present exemplary embodiment, in a case where the firmware update processing is instructed, the CPU 340 executes the processing of steps S505 and S506 (also steps S508 and S509). The firmware update processing includes a series of processing including firmware reception processing, firmware data update processing, and initialization processing to be performed at the time of initial start-up after update. In this case, the CPU 340 may execute the processing of steps S505 to S509 in accordance with the start and end of each processing included in the firmware update processing. Further, the CPU 340 may execute the processing of steps S505 to S509 in accordance with the start and end of a series of processing included in the firmware update processing.

In the case of receiving firmware, the number of pieces of data to be stored in the SSD 106 may be less than that in the firmware update processing. Accordingly, for example, in the case of firmware reception processing, the CPU 340 may be configured not to execute the processing of steps S505 and S506 (also steps S508 and S509). Further, the CPU 340 may be configured to execute the processing of steps S505 and S506 (also steps S508 and S509) in the firmware update processing.

Further, in the present exemplary embodiment, the CPU 340 may execute the processing of steps S505 and S506 immediately before starting the specific processing, or may execute the processing between the start of the specific processing and the end of other processing executed prior to the specific processing. Alternatively, the CPU 340 may execute the processing of steps S508 and S509 immediately after the end of the specific processing, or may execute the processing between the end of the specific processing and the start of other processing executed after the specific processing.

Further, the CPU 340 may reboot the image forming apparatus 101, for example, before or after processing such as firmware reception processing, firmware update processing, or loading or update processing to be performed at the time of initial start-up, or therebetween. In this case, the processing of steps S505 and S506 may be executed using reboot or mount of an SSD partition before or after the firmware update as a trigger.

As described above, in the present exemplary embodiment, the information processing system adjusts the write conditions so that the capacity of data to be actually written to the SSD 106 can be reduced, before starting the specific processing including the data write processing for writing data to the SSD 106. Thus, the information processing system can reduce the total capacity of data to be actually written to the SSD 106 by the specific processing. However, for example, the data write speed is reduced and the amount of data to be stored in the memory 341 is increased in the adjusted write conditions, which may lead to an increase in the size of data that can be lost due to instantaneous interruption of a power supply. Therefore, the information processing system restores the write conditions to the original conditions after completion of the specific processing. Consequently, it is possible to prevent an increase in the size of data that can be lost due to instantaneous interruption of a power supply after the end of the specific processing.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-031106, filed Feb. 23, 2018, which is hereby incorporated by reference herein in its entirety.

What is claimed is:

1. An apparatus comprising:
a nonvolatile semiconductor storage device having a cache area and a storage area; and
a controller configured to set a setting to a first write setting or a second write setting based on a type of data write processing,
wherein the first write setting performs storage processing causing the nonvolatile semiconductor storage device to store data from the cache area into the storage area by transmitting a first instruction to write data to the nonvolatile semiconductor storage device, wherein the first instruction is transmitted a first number of times,
wherein the second write setting performs storage processing causing the nonvolatile semiconductor storage device to store data from the cache area into the storage area by transmitting a second instruction to write data to the nonvolatile semiconductor storage device, wherein the second instruction is transmitted a second number of times larger than the first number of times,
wherein the controller sets the setting to the second write setting in the nonvolatile semiconductor storage device in response to determining the type of the data write processing is an update of firmware of the apparatus.

2. The apparatus according to claim 1, wherein the storage area is a flash memory.

3. The apparatus according to claim 1, wherein the controller performs the update of the firmware of the apparatus after the setting is set to the second write setting in the nonvolatile semiconductor storage device in a case where the type of the data write processing is the update of the firmware of the apparatus.

4. The apparatus according to claim 3, wherein the data write processing includes processing for writing each of a predetermined number or more of pieces of data to the storage area, the predetermined number or more of pieces of data having a size smaller than or equal to a predetermined size.

5. The apparatus according to claim 3, wherein the data write processing includes processing for writing a predetermined number or more of piece of data to the storage area.

6. The apparatus according to claim 3, wherein the controller changes the setting in the nonvolatile semiconductor storage device from the second write setting to the first write setting based on completion of processing of writing data into the nonvolatile semiconductor storage device.

7. The apparatus according to claim 1,
wherein a default setting of the nonvolatile semiconductor storage device is the first write setting, and
wherein the controller changes a setting of the nonvolatile semiconductor storage device from the first write setting to the second write setting in a case where the controller performs the update of the firmware of the apparatus.

8. The apparatus according to claim 1, wherein the controller sets the setting to the second write setting in the nonvolatile semiconductor storage device, in a case where the type of the data write processing is first activation after a change of a version of the apparatus.

9. The apparatus according to claim 1, wherein the controller sets the setting to the second write setting in the nonvolatile semiconductor storage device in a case where the type of the data write processing is clearing the setting in the nonvolatile semiconductor storage device or first activation alter a change of setting of the apparatus.

10. The apparatus according to claim 1, wherein the first number of times is once, and the second number of times is a plurality of times.

11. A method to be executed by an apparatus, the method comprising:
set a setting to a first write setting or a second write setting based on a type of data write processing,
wherein the first write setting performs storage processing causing a nonvolatile semiconductor storage device to store data from a cache area into a storage area by transmitting a first instruction to write data to the nonvolatile semiconductor storage device, wherein the first instruction is transmitted a first number of times,
wherein the second write setting performs storage processing causing the nonvolatile semiconductor storage device to store data from the cache area into the storage area by transmitting a second instruction to write data to the nonvolatile semiconductor storage device, wherein the second instruction is transmitted a second number of times larger than the first number of times,
wherein the setting is set to the second write setting in the nonvolatile semiconductor storage device in response to determining the type of the data write processing is an update of firmware of the apparatus.

12. The method according to claim 11, wherein the storage area is a flash memory.

13. The method according to claim 11, wherein a default setting of the nonvolatile semiconductor storage device is the first write setting, and wherein a setting of the nonvolatile semiconductor storage device is changed from the first write setting to the second write setting in a case where the update of the firmware of the apparatus is performed.

14. The method according to claim 11, further comprising performing the update of the firmware of the apparatus after setting the second write setting in the nonvolatile semiconductor storage device in a case where the type of the data write processing is the update of the firmware of the apparatus.

15. The method according to claim 14, wherein the data write processing includes processing for writing each of a predetermined number or more of pieces of data to the storage area, the predetermined number or more of pieces of data having a size smaller than or equal to a predetermined size.

16. The method according to claim 14 wherein the data write processing includes processing for writing a predetermined number or more of piece of data to the storage area.

17. The method according to claim 14, further comprising changing the setting in the nonvolatile semiconductor storage device from the second write setting to the first write setting based on completion of processing of writing data into the nonvolatile semiconductor storage device.

18. The method according to claim 11, wherein the setting is set to the second write setting in the nonvolatile semiconductor storage device in a case where the type of the data write processing is first activation after a change of a version of the apparatus.

19. The method according to claim 11, wherein the setting is set to the second write setting in the nonvolatile semiconductor storage device in a case where the type of the data write processing is clearing the setting in the nonvolatile semiconductor storage device or first activation after a change of setting of the apparatus.

20. The method according to claim 11, wherein the first number of times is once, and the second number of times is a plurality of times.

\* \* \* \* \*